United States Patent [19]

Satou et al.

[11] 4,044,386

[45] Aug. 23, 1977

[54] TAPE CASSETTE WITH ERASE INHIBIT PLUG

[75] Inventors: Takateru Satou; Haruo Shiba, both of Tokyo, Japan

[73] Assignee: TDK Electronics Co., Ltd., Tokyo, Japan

[21] Appl. No.: 679,369

[22] Filed: Apr. 22, 1976

[30] Foreign Application Priority Data

Apr. 22, 1975 Japan .............................. 50-54881[U]

[51] Int. Cl.² ...................... G11B 15/04; G11B 23/06
[52] U.S. Cl. ...................................... 360/60; 360/132
[58] Field of Search ............................ 360/60, 132, 66

[56] References Cited

U.S. PATENT DOCUMENTS

| | | | |
|---|---|---|---|
| 2,466,514 | 4/1949 | Vagtborg | 360/60 |
| 3,686,470 | 8/1972 | Stahlberg | 360/132 |
| 3,688,057 | 8/1972 | Lee | 360/60 |
| 3,777,074 | 12/1973 | Olmstead | 360/60 |
| 3,826,489 | 7/1974 | Watkins, Jr. | 360/132 |
| 3,848,265 | 11/1974 | Biery et al. | 360/132 |
| 3,950,786 | 4/1976 | Shapley | 360/132 |

*Primary Examiner*—Jay P. Lucas
*Attorney, Agent, or Firm*—Oblon, Fisher, Spivak, McClelland & Maier

[57] ABSTRACT

A tape cassette characterized by a bias changeover slot located adjacent to an accidental erasure preventive slot wherein, when the accidental erasure preventive slot is kept in an inoperative state, a U-shaped snap is secured in such slot so that the base of the U-shaped snap is disposed to cover the opening of the accidental erasure preventive slot, and when the slot is to be kept in an operative state, the U-shaped snap is secured in the slot so that the base of the U-shaped snap is arranged against the wall of the slot located opposite the adjacent bias changeover slot, whereby the accidental erasure preventive slot is uncovered and the snap is secured within the cassette.

4 Claims, 12 Drawing Figures

F I G. 6
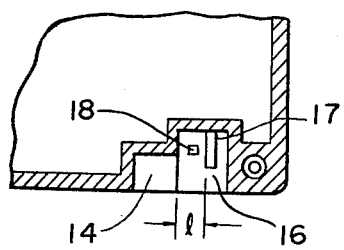

TAPE CASSETTE WITH ERASE INHIBIT PLUG

BACKGROUND OF THE INVENTION

The present invention relates to tape cassettes.

Prior art techniques have provided tape cassettes which are equipped with a preventive slot on their bottom sides, which is covered with a snap cover, and which serves to prevent accidental erasures. With the snap removed, the slot causes a detector of associated tape recorder to operate, thus making the recording button thereof inoperative. In other words, a tape cassette, with its snap removed after recording thereon, inhibits duplicate recording, or erasing of such recording. This however, gives rise to the problem that the slot must be filled with something to function as the snap or the cassette itself must be replaced with a new one when it is desired to erase the recording from the tape or to re-cord thereon.

One prior art solution to this problem is an arrangement which permits the snap to be slid or turned over on a hinge. This again is impractical for chrome-bias tape or like cassettes in which the bias changeover slot is formed adjacent to the accidental erasure preventive slot, because the snap readily closes the bias changeover slot when it is slid or turned over. These prior art approaches will now be described in more detail by referring to the accompanying drawings.

FIGS. 1 and 2 schematically show the construction of one popularly known tape cassette having a bias changeover slot, in which a snap 1 is disposed to cover the opening of an accidental erasing preventive slot 2 being disposed adjacent to the bias changeover slot 3. The snap 1, as already indicated, is necessary for recording, but must be removed by detaching it from its base 4 when the recorded data is to be prevented from being erased by mistake. Without the snap 1, the miserasing or accidental erasure preventive slot 2 is open to a detection rod extended from a miserasing preventive device, e.g., a microswitch, installed in the associated tape recorder. When the detection rod enters the slot 2, the microswitch operates to make the recording button of the recorder inoperative. Hence, on a tape cassette with its snap removed, erasing cannot be effected but rather, only playback of the recorded cassette is available. When a tape recorder provided with an automatic chrome-bias changeover mechanism is used, the bias changeover slot is open to the bias changeover mechanism of the recorder, permitting chrome-bias recording to start automatically.

As described above, tape cassettes of the type having no bias changeover slot involve certain difficulties once the snap is detached. Prior art techniques have proposed the following improvements on this type of tape cassette. With reference to FIG. 3, a schematic plan view is shown to illustrate part of a tape cassette in which a plastic plate 5 is used instead of the snap. The plate 5 is moved in the direction of an arrow 6, i.e., toward the center of the cassette after recording, whereby the accidental erasure preventive slot is opened.

Another prior art improvement is schematically shown in FIGS. 4 and 5, in which a plastic plate 7 pivotably mounted on a hinge 8 is used instead of the conventional snap. The hinge 8 is held in a column 9 formed with a case body 11. The accidental erasure preventive slot 12 can thus be opened by pivoting the plate 7 in the direction indicated by arrow 10, i.e., toward the center of the case 11. The plate 7 is turned over and fitted to the case 11.

These prior art arrangements, however, cannot be utilized for tape cassettes of the type equipped with the bias changeover slot, because the plate 5 or 7 necessarily covers the bias changeover slot when it is slid or turned over to open the accidental erasure preventive slot.

Yet another prior art solution to the problem is the use of a plug instead of the snap, which can be pulled out to open the slot and set into position to close it, when necessary, as in digital tape cassettes. This construction, however, poses another problem in that the plug is very likely to be lost once it is removed.

SUMMARY OF THE INVENTION

It is therefore an object of the present invention to provide an improved tap cassette which is free of the foregoing drawbacks.

The objects of the present invention have been attained by providing a tape cassette in which a bias changeover slot is disposed adjacent to an accidental erasure, or miserasing, preventive slot and wherein when the miserasing preventive slot is to be kept in an inoperative state, a specially formed U-shaped snap is secured in the miserasing preventive slot with the base thereof being disposed at the opening of the miserasing preventive slot, and when the miserasing preventive slot is to be kept in an operative state, the U-shaped snap is secured in the miserasing preventive slot so that the base of the U-shaped snap is arranged against the wall of the miserasing preventive slot opposite the bias changeover slot.

BRIEF DESCRIPTION OF THE DRAWINGS

Various other objects, features and attendant advantages of the present invention will be more fully appreciated as the same becomes better understood from the following detailed description, when considered in connection with the accompanying drawings, in which:

FIGS. 6 and 7 are a sectional plan view and a side view, respectively, showing an essential part of a tape cassette embodying the present invention;

DETAILED DESCRIPTION OF THE PREFERRED EMBODIMENTS

Figure 1:
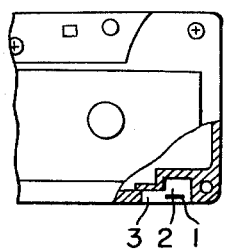
FIG. 1 is a plan view showing the construction of a prior art tape cassette having a snap cover, with a part being cut away to illustrate this snap cover.
Figure 2:
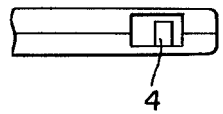
FIG. 2 is a side view of the tape cassette construction shown in FIG. 1.
Figure 3:
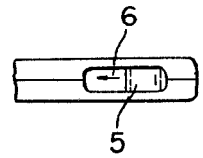
FIG. 3 is a side view showing an essential part of another prior art tape cassette having a slidable cover.
Figure 4:
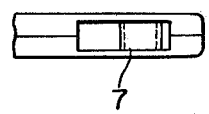
FIGS. 4 and 5 are side and plan views, respectively, with the latter being shown in section, and showing an essential part of yet another prior art tape cassette wherein a pivotable cover is provided for the accidental erasure preventive slot.
Figure 5:
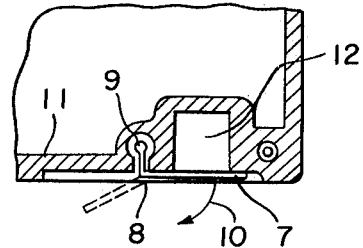
Figure 7:
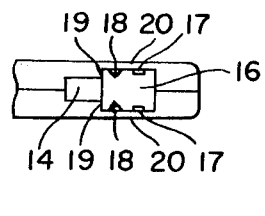

Referring now to the drawings, and more particularly to FIGS. 6 and 7, an embodiment of the present invention is schematically shown having a miserasing or accidental erasure preventive slot 16 and a bias changeover slot 14 disposed adjacent thereto. The accidental erasure preventive slot 16 is larger than the bias changeover slot 14, and a step 19 is formed between the two slots. In the accidental erasure preventive slot 16, there are ridges 17 and projections 18 formed on the opposite walls thereof.

Figure 8:
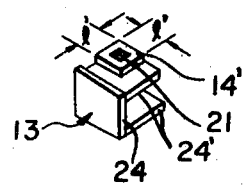
FIG. 8 is a perspective view showing a U-shaped snap being used for the embodiment shown in FIGS. 6 and 7.

FIG. 8 schematically shows a U-shaped snap 13 having a bottom or base 24 and two side or upstanding walls 24' on which square projections 14' are formed. A square hollow 21 is formed in the center of each of the projections 14'. The length $l'$ of an arm of the square 14' is aproximately equal to the length $l$ from an end 20 of the ridge 17 in the slot 16 to the step 19, as shown in FIG. 6.

Figure 9:
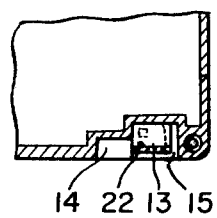
FIG. 9 is a sectional plan view showing an essential part of a tape cassette with the U-shaped snap of FIG. 8 being set in position.
Figure 10:
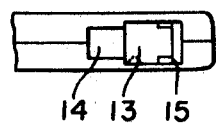
FIG. 10 is a side view of the construction shown in FIG. 9.

FIGS. 9 and 10 schematically show the state where the U-shaped snap 13 is inserted into the miserasing or accidental erasure preventive slot 16 of the tape cassette to make the slot 16 inoperative. In this state, the base 24 of the snap 13 is located at the opening of the accidental erasure preventive slot 16, that is, such that the ridge 17 in the slot 16 is in contact with the edge of the projection 14' of the U-shaped snap 13, because $l=l'$. At the same time, the projection 18 engages the hollow 21 whereby the snap 13 is secured in position. In this arrangement, there is gap 15 provided between the snap and the end wall of slot 16 opposite the bias changeover slot 14. This gap is used in the state where the U-shaped snap 13 is set in a position to make the accidental erasure preventive slot 16 inoperative. The gap is as narrow as 1 to 2 mm, which is sufficiently smaller than the width of the slot 16 to eliminate the possibility of causing the miserasing preventive mechanism of the tape recorder to work on the gap 15, as by permitting a detection rod to extend thereinto.

Figure 11:
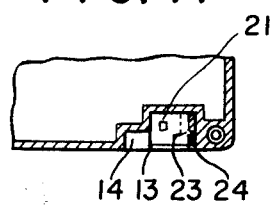
FIGS. 11 and 12 are a sectional plan view and a side view, respectively, showing an essential part of a tape cassette with the U-shaped snap set in position in a different manner.
Figure 12:
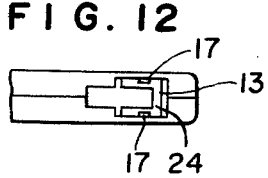

The U-shaped snap 13 can be removed by inserting the tip of a ball-point pen or the like into the bias changeover slot 14 and pulling the inside part 22 of the base 24 of the snap 13 with the pen point. This causes the hollow 21 of the square projection 14' of the snap 13 to be disengaged from the projection 18 of the miserasing preventive slot 16, thereby allowing the U-shaped snap 13 to come off. The removed snap 13 is then again inserted into the same miserasing preventive slot 16 in such a manner that the base 24 of the snap 13 is located in the former gap 15 of the slot 16, that is, so that the base 24 comes in contact with the wall of the slot 16 opposite the bias changeover slot 14, as shown in FIGS. 11 and 12. In this state also, the ridge 17 in the slot 16 is in contact with the edge of the projection 14' of the snap 13, and the projection 18 engages the hollow 21 whereby the snap 13 is secured in position. The size of the snap 13 in this position meets the standardized size of the miserasing preventive slot 16. The snap 13 can be removed by the use of a ball-point pen or the like in such manner that the inside 22 of the base 24 of the snap 13 is raised applying the pen point to a hollow 23 formed in the snap 13.

According to the present invention, as described above, the accidental erasure preventive slot can be readily opened or closed independent of the bias changeover slot, without the usual possibility of losing the snap, when it is not being used to close the accidental erasure preventive slot. Also, the tape cassette of the invention can be used for sound tape cassettes as well as for digital tape cassettes.

Obviously, many modifications and variations of the present invention are possible in light of the these teachings. Therefore, it is to be understood that within the scope of the appended claims, the invention may be practiced otherwise than as specifically described herein.

What is claimed as new and desired to be secured by letters patent of the United States is:

1. A tape cassette comprising:
   means defining an accidental erasure preventive slot having at least one ridge member and at least one projecting member on an internal wall thereof;
   means defining a bias changeover slot adjacent to said accidental erasure preventive slot; and
   a U-shaped snap for selectively closing and opening said accidental erasure preventive slot while not disturbing said bias changeover slot and having a base and two arms upstanding therefrom;
   means for retaining said U-shaped snap within the accidental erasure preventive slot in either of two positions whereby said base of U-shaped snap is disposed at the opening of the accidental erasure preventive slot when the said accidental erasure preventive slot is to be kept in an inoperative state, and said base of the U-shaped snap is set against the wall of the accidental erasure preventive slot being disposed opposite the bias changeover slot when said accidental erasure preventive slot is to be kept in an operative state.

2. The tape cassette according to claim 1, wherein the accidental erasure preventive slot is larger than the bias changeover slot, and a step is formed between the two slots.

3. The tape cassette according to claim 2, wherein the U-shaped snap further comprises a square projection having a hollow central portion disposed on at least one of said upstanding arms thereof.

4. The tape cassette according to claim 3, wherein the length of said square projection is approximately equal to the distance from an end of said ridge in the slot to said step formed between said two slots.

* * * * *